(12) United States Patent
Park et al.

(10) Patent No.: US 10,210,201 B2
(45) Date of Patent: Feb. 19, 2019

(54) METHOD AND SYSTEM FOR APP PAGE RECOMMENDATION VIA INFERENCE OF IMPLICIT INTENT IN A USER QUERY

(71) Applicant: TCL RESEARCH AMERICA INC., San Jose, CA (US)

(72) Inventors: Dae Hoon Park, San Jose, CA (US); Mengwen Liu, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 280 days.

(21) Appl. No.: 15/154,034

(22) Filed: May 13, 2016

(65) Prior Publication Data

US 2017/0329820 A1 Nov. 16, 2017

(51) Int. Cl.
*G06F 17/30* (2006.01)
*G10L 15/26* (2006.01)

(52) U.S. Cl.
CPC .... *G06F 17/30401* (2013.01); *G06F 17/3043* (2013.01); *G06F 17/3053* (2013.01); *G06F 17/30522* (2013.01); *G06F 17/30554* (2013.01); *G10L 15/26* (2013.01)

(58) Field of Classification Search
CPC .............. G06F 17/30401; G06F 17/30522
See application file for complete search history.

(56) References Cited

U.S. PATENT DOCUMENTS

| 2010/0063877 A1* | 3/2010 | Soroca | G06F 17/30749 |
| | | | 705/14.45 |
| 2013/0339345 A1* | 12/2013 | Soto Matamala | H04W 4/21 |
| | | | 707/722 |
| 2016/0163311 A1* | 6/2016 | Crook | G10L 15/183 |
| | | | 704/275 |

* cited by examiner

*Primary Examiner* — Thu Nguyet T Le
(74) *Attorney, Agent, or Firm* — Anova Law Group, PLLC (57) ABSTRACT

In accordance with some embodiments of the disclosed subject matter, a method and a system for App page recommendation are provided. The method includes: based on social media contents generated by a user, establishing a parallel corpora comprising an implicit query database including a plurality of user implicit query texts, and an explicit query database including a plurality of user explicit query texts, wherein the plurality of user implicit query texts correspond to the plurality of user explicit query texts; receiving a voice user query from the user; converting the voice user query to a text query; extracting implicit intent text from the text query; inferring a user intent using the parallel corpora based on the extracted implicit intent text; ranking a plurality of App pages according to the inferred user intent; and recommending a subset of the plurality of App pages to the user based on the ranking.

18 Claims, 3 Drawing Sheets

METHOD AND SYSTEM FOR APP PAGE RECOMMENDATION VIA INFERENCE OF IMPLICIT INTENT IN A USER QUERY

FIELD OF THE INVENTION

The present invention generally relates to the field of information technology and user interface technologies and, more particularly, to a method for App page recommendation and system thereof.

BACKGROUND

With rapid development of Internet, people leave massive amount of their status messages on social media. At the same time, virtual digital-assistants, such as Apple's Siri, receive billions of requests every week. A myriad of such user-generated queries provided ample opportunities to analyze them. While some user-generated queries show explicit intention for commercial purposes, some other queries do not indicate any explicit intention, and current virtual assistants often fail to analyze such queries. Much efforts are mainly focused on detecting whether a user text contains such commercial intention or not. However, according to the present disclosure, product recommendation based on implicit commercial intention in the user text may help improving the recommendation accuracy and efficiency.

The disclosed methods and systems are directed to solve one or more problems set forth above and other problems.

BRIEF SUMMARY OF THE DISCLOSURE

In accordance with some embodiments of the disclosed subject matter, a method and a system for App page recommendation are provided.

One aspect of the present disclosure includes a method for App page recommendation, including: based on social media contents generated by a user, establishing a parallel corpora comprising an implicit query database including a plurality of user implicit query texts, and an explicit query database including a plurality of user explicit query texts, wherein the plurality of user implicit query texts correspond to the plurality of user explicit query texts; receiving a voice user query from the user; converting the voice user query to a text query; extracting implicit intent text from the text query; inferring a user intent using the parallel corpora based on the extracted implicit intent text; ranking a plurality of App pages according to the inferred user intent; and recommending a subset of the plurality of App pages to the user based on the ranking.

In some embodiments, extracting implicit intent text from the text query comprises: estimating a query language model of a word in the text query by using an intention likelihood of the word and a confidence weight of the word.

In some embodiments, inferring the user intent using the parallel corpora based on the extracted implicit intent text comprises: matching the implicit intent text with the plurality of user implicit query texts in the implicit queries database of the parallel corpora; and retrieving the corresponding explicit intent text based on a matched user implicit query text.

In some embodiments, matching the implicit intent text with the plurality of user implicit query texts comprises: employing a Query Likelihood retrieval modeling to score an implicit intent document with respect to the implicit intent text extracted from the text query.

In some embodiments, retrieving the corresponding explicit intent text based on a matched user implicit query text comprises: pre-processing the plurality of explicit intent text to generate a plurality of intention topic models by employing an intention topic modeling; estimating each intention topic model to calculate a probability that the corresponding explicit intention text matches the implicit intent document; and removing a subset of the plurality of intention topic models that are considered as noisy topics.

In some embodiments, the intention topic modeling is Intention Latent Dirichlet Allocation (LDA) model.

In some embodiments, estimating each intention topic models comprises: running a plurality of Markov chains and taking an average values of a plurality of probabilities that are resulted by the plurality of Markov chains.

In some embodiments, ranking a plurality of App pages according to the inferred user intent comprises: retrieving a plurality of App pages that is relevant to the inferred user intent; measuring a relevance index of each of the plurality of App pages to the inferred user intent; and ranking the plurality of App pages based on the measured relevance indexed.

In some embodiments, retrieving the plurality of App pages that is relevant to the inferred user intent is using KL-divergence retrieval model with Dirichlet prior smoothing parameter.

In some embodiments, the plurality of user implicit query texts are correspond to the plurality of user explicit query texts by using a template "I <EXP> because <IMP>", wherein <EXP> is one explicit intention text and <IMP> is one implicit intention text.

Another aspect of the present disclosure includes a system for App page recommendation, comprising: a parallel corpora established based on social media contents generated by a user, comprising: an implicit queries database including a plurality of user implicit query texts, and an explicit queries database including a plurality of user explicit query texts, wherein the plurality of user implicit query texts are correspond to the plurality of user explicit query texts with each other; a query module configured for: receiving a voice user query from the user, and converting the voice user query to a text query; a user intent determination module configured for: extracting implicit intent text from the text query, and inferring a user intent using the parallel corpora based on the extracted implicit intent text; and an App page recommendation module configured for: ranking a plurality of App pages according to the inferred user intent, and recommending a subset of the plurality of App pages to the user based on the ranking.

In some embodiments, the user intent determination module is further configured for: estimating a query language model of a word in the text query by using an intention likelihood of the word and a confidence weight of the word.

In some embodiments, the user intent determination module is further configured for: matching the implicit intent text with the plurality of user implicit query texts in the implicit queries database of the parallel corpora; and retrieving the corresponding explicit intent text based on a matched user implicit query text.

In some embodiments, the user intent determination module is further configured for: employing a Query Likelihood retrieval modeling to score an implicit intent document with respect to the implicit intent text extracted from the text query.

In some embodiments, the user intent determination module is further configured for: pre-processing the plurality of explicit intent text to generate a plurality of intention topic models by employing an intention topic modeling; estimating each intention topic model to calculate a probability that the corresponding explicit intention text matches the implicit intent document; and removing a subset of the plurality of intention topic models that are considered as noisy topics.

In some embodiments, the user intent determination module is pre-processing the plurality of explicit intent text by using Intention Latent Dirichlet Allocation (LDA) model.

In some embodiments, the user intent determination module is further configured for: running a plurality of Markov chains and taking an average values of a plurality of probabilities that are resulted by the plurality of Markov chains.

In some embodiments, the App page recommendation module is further configured for: retrieving a plurality of App pages that is relevant to the inferred user intent; measuring a relevance index of each of the plurality of App pages to the inferred user intent; and ranking the plurality of App pages based on the measured relevance indexed.

In some embodiments, the App page recommendation module is retrieving the plurality of App pages by using KL-divergence retrieval model with Dirichlet prior smoothing parameter.

In some embodiments, each user implicit query text in the implicit queries database is associated with a corresponding user explicit query text in the explicit queries database by using a template "I <EXP> because <IMP>", wherein <EXP> is the explicit intention text and <IMP> is the corresponding implicit intention text.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

In social media, people discuss various topics such as their current status including what they do, how they feel, and where they are. Often, social media users express their intention to purchase a product in an implicit or explicit way. For example, a sentence "I will buy an iPhone" contains the user's explicit intention to buy the product. In another sentence "I lost my cellphone," the user does not explicitly express the intention to buy a cellphone, but it can be inferred that the user may want to purchase a cellphone (implicit intention). Such text with implicit intention also can appear in user queries for virtual assistants. Because commercial intention analysis for implicit texts can provide a way to link "buyers" and "sellers," the role of such analysis may be desired for many service providers or the likes.

As used herein, the term "App" may be used to represent a software program designed to run on smartphones and other mobile devices, i.e., a mobile App. The App may be downloaded to the user terminal from a server to be used by the user via the user terminal, or the App may be used by the user directly from the server. An App page may refer to a webpage for downloading or invoking the App to provide one or more functions to the user. An App page may be recommended to the user on the user terminal in a form of a link, clicking on which may cause the user terminal to download or execute the corresponding App.

Figure 1:
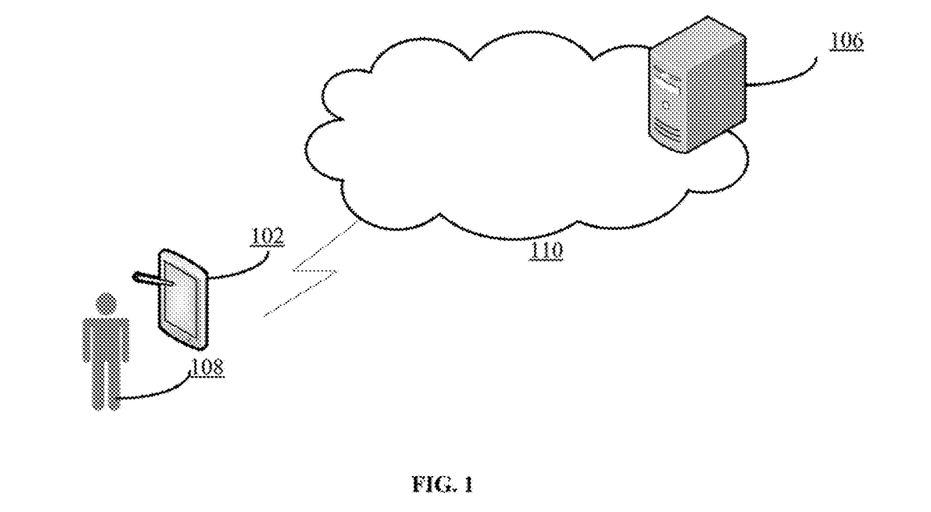
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a terminal 102, a server 106, a user 108, and a network 110.

A terminal 102 also known as a terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. The mobile terminal 102 may be implemented on any appropriate computing platform.

The terminal 102 may be used by any user 108 to connect to network 110 and make requests to server 106. Each user 102 may use one or more terminals 102. As directed by the user 108, the terminal 102 may obtain webpages from any appropriate sources, such as from a local storage device, from a wired or wireless network device of a service provider, or from the Internet.

Further, the server 106 may refer to one or more server computers configured to provide certain web server functionalities (e.g., search server). The server 106 may include one or more processors to execute computer programs in parallel. The server 106 may store webpages to be accessed by terminals, and each of these webpages has a unique web address. The unique web address is also called Uniform Resource Locator (URL). The server 106 may also provide various Apps to the terminal 102 as requested by the user 108 and/or may make various recommendations to the user about the web pages and/or Apps and App functions. The server 106 may also be a cloud server.

Terminals 102 and server 106 may communicate with each other through communication network 110, such as a cable network, a phone network, and/or a satellite network, etc. Although one user 108, one terminal 102, and one server 106 are shown in FIG. 1, any number of users, terminals, and/or servers may be included.

Figure 2:
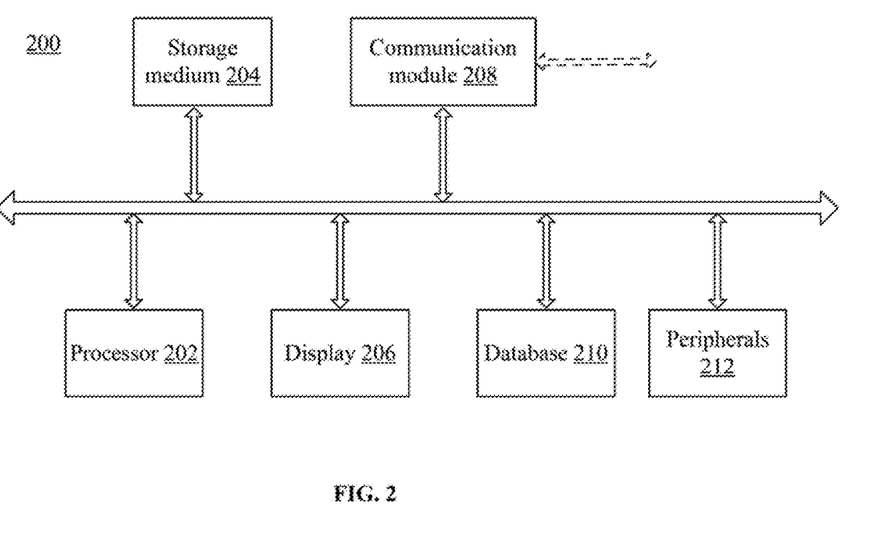
FIG. 2 illustrates an exemplary computing system consistent with the disclosed embodiments.

Terminal 102, and/or server 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate hardware processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, the server 106 may recommend to the user 108, and the user 108 may use, through terminal 102 or a web browser on terminal 102, certain applications (apps) or mobile Apps available on the terminal 102 or online from various servers 106. A mobile App may have a home page or other direct access point that may be used to achieve a certain function. The mobile App access point may include an entrance to the function on the mobile device or web, a type of the function, and other relevant information, such as location, status, and nature of the function, etc. The function may include a native mobile app, a web app, and a customized function as a cloud application programming interface (API).

A native mobile App may refer to a mobile device application that is coded in a specific programming language for a particular operating system. The native mobile App is installed directly on a mobile device. A web App may refer to a website that is tailored to function via a web browser on a mobile device. The entrance to function and the type of the entrance may include a variety of configurations.

For example, an access point may include a link to a web App page, a link to a customized function, a link or shortcut to an installed native App page, a link to a page of a compressed version of a native app, a link to the action of native App download and installation, and a link to an App guideline page that suggests the user to open an alternative app, etc. Further, a functional flow of user's action can be built up without using the App-level operations. The App-level operations refer to certain operations that are performed among multiple mobile apps or web services by frequently using the home page, and thus more user interactions (screen touches or key presses) may be required and it may be more difficult to implement a function sequence.

Figure 4:
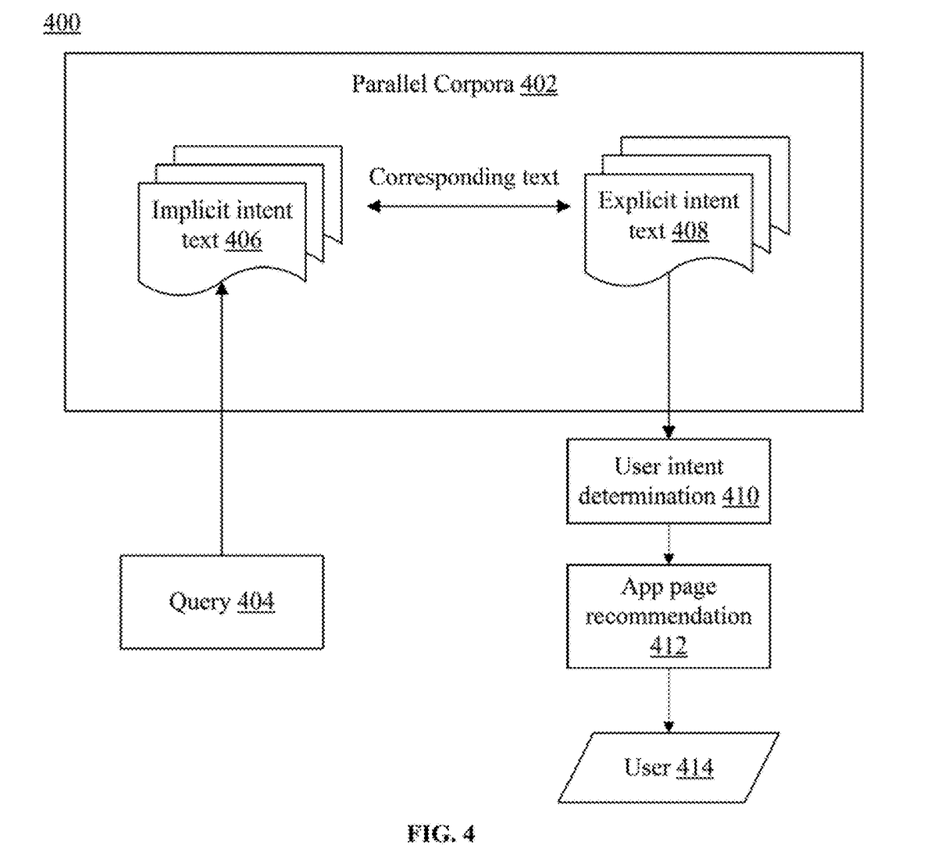
FIG. 4 illustrates a structure schematic diagram of an exemplary App page recommendation system consistent with the disclosed embodiments.

Referring to FIG. 4, a structure schematic diagram of an exemplary App page recommendation system is shown consistent with the disclosed embodiments. As illustrated, the App page recommendation system can include a parallel corpora 402 containing an implicit intention text storage 406 and a corresponding explicit intention text storage 408, a query module 404, a user intent determination module 410, an app page recommendation module 412, and any other suitable components.

Figure 3:
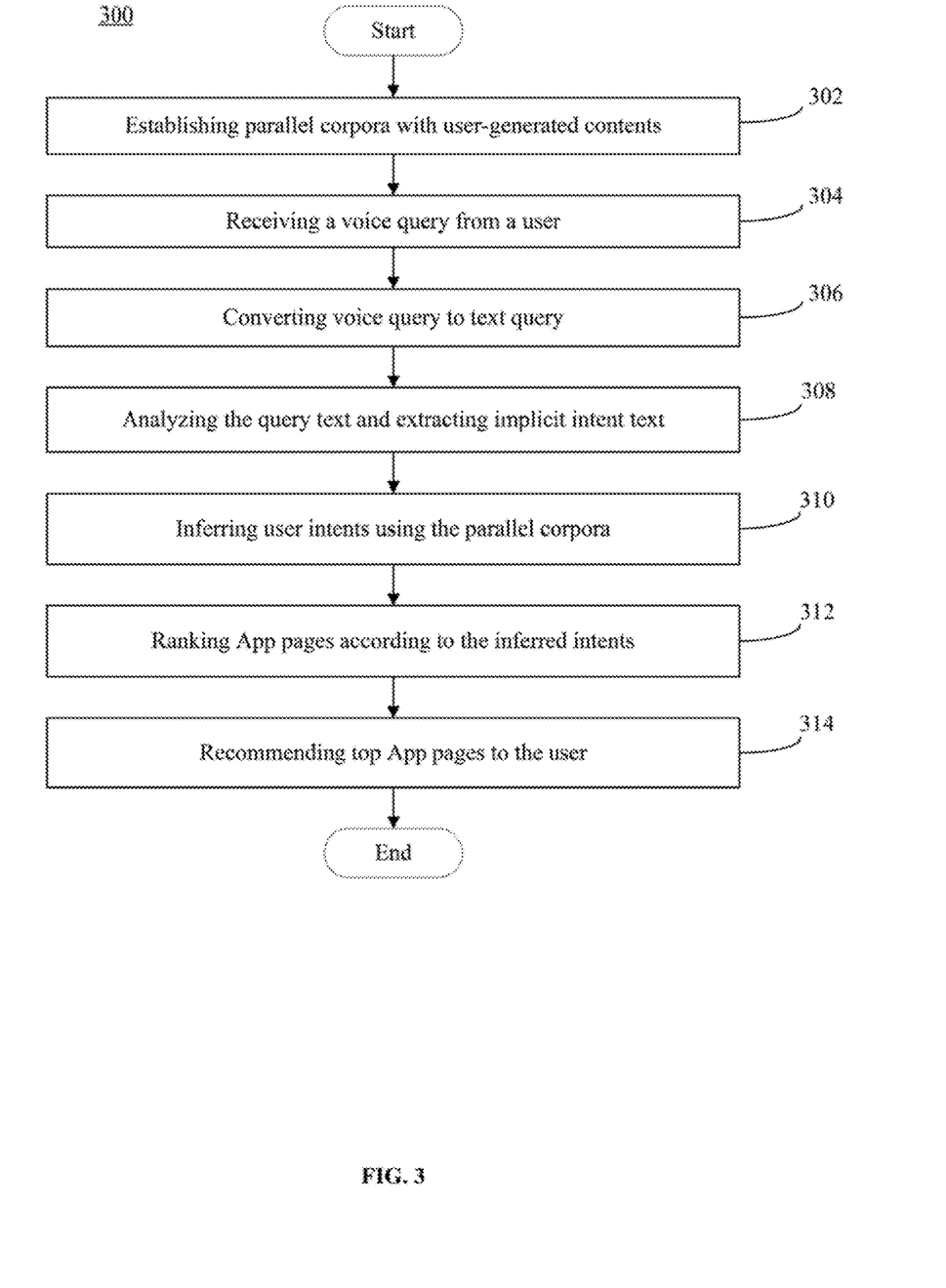
FIG. 3 illustrates an exemplary App page recommendation process consistent with the disclosed embodiments.

Corresponding to FIG. 4 and referring to FIG. 3, an exemplary App page recommendation process is shown in accordance with some embodiments of the disclosed subject matter.

As illustrated, at the beginning of the process, at Step 302, parallel corpora with user-generated content are established. The parallel corpora may refer to collections of parallel texts of two or more corresponding texts with similar texts or similar translated or inferred meaning. As used herein, the parallel corpora may include pairs of implicit intention text and explicit intention text from user-generated contents, e.g., social media text data.

The term "explicit query/intent text" and the term "implicit query/intent text" as used herein are distinguished that the explicit queries contain their intention clearly, while implicit queries do not. For example, user stated texts such as "I'm hungry," "I'm so tired," and "I have no one to talk to" do not reveal its intention explicitly while they certainly imply the need for something, and the texts can be classified as implicit queries. The corresponding explicit queries may be "I want food," "relaxing music," and "dating app," respectively, and these types of explicit queries have been used in traditional search engines.

In some embodiments, the social media can be used to learn user behavior when a user implicitly expresses intention. For example, tweets that contain information about what people truly desire when they implicitly express their needs can be collected. The parallel corpora can be built from the tweets and follow information retrieval approach to infer user intention.

That is, in order to retrieve app pages relevant to user query with implicit intention, social media can be used to build parallel corpora 402, which contain implicit intention text and its corresponding explicit intention text.

Referring to FIG. 3, after the parallel corpora is established (302), a voice query from a user may be received (304). The user may input the voice query via various voice input devices, such as an internal microphone on the user terminal, or an external microphone or other recording device, which may send the voice query to the user terminal.

At Step 306, the voice query can be converted into text. In some embodiments, a query converting module can convert the voice query to text query by using any suitable speech recognition technique, such as hidden Markov model, dynamic time warping, neural networks, deep feedforward and recurrent neural network, etc. For example, user query module 404 can receive query q that is a user's text or voice input to virtual assistants that implicitly expresses the user need.

At Step 308, the text query can be analyzed to extract implicit intention text. In some embodiments, a keyword in the text query that describe a physical status, an emotional status, or a mental status of a person can be marked, and a phrase and/or a short sentence that contains the keyword can be extracted as an implicit intention text. For example, the word "hungry" in the text query "I'm hungry" can be marked as a keyword.

In some embodiments, an implicit intention text database can be built up in the parallel corpora. A keyword matching process can be performed between the text query and the implicit intention text database to determine if the text query contains an implicit intention text.

According to the disclosed embodiments, the entities of user needs herein are mobile app pages. Define each app a of all apps A contains app pages $\{a_1, \ldots, a_J\}$, where J is the number of app pages for a. Assuming q always includes a user intent that is implicitly expressed. Each mobile app a and each app page $a_j$ have their own text representation. Given social media text data D consisting of implicit intention texts $D^{imp}$ and its corresponding explicit intention texts $D^{exp}$. The goal is to retrieve a list of mobile app pages for each q based on their text representations, where the app pages are ordered by their relevance to the user intent in q.

When a user implicitly expresses user needs in a query q, similar text can be searched in the implicit intention text storage 406 in the parallel corpora 402. Then, user intention can be inferred from the explicit intention text that corresponds to the implicit intention text.

Define the query language model p(w|q) as $$p(w|q) = (1-\gamma)p_{ml}(w|q) + \gamma p(w|I_q) \qquad (1)$$

where w is a word, $p_{ml}(w|q)$ is a maximum likelihood estimation of the word w being in the query q, and $p(w|I_q)$ is the intention language model for query q whose weight is $\gamma \cdot p_{ml}(w|q)$ is computed by $$\frac{\text{count}(w, q)}{\sum_{w'} \text{count}(w', q)}$$

where count(w, q) is the number of w's occurrences in query q.

Weight $\gamma$ can be defined as the confidence in the intention language model. That is, if it is not confident on the estimated intention language model, more weight is given on $p_{ml}(w|q)$, meaning that the intention language model is not trusted and instead the original query language model is trusted more. Although the parallel corpora is built to "translate" implicit intention text into explicit intention text, the inferred intention may not be correct for various reasons, which are discussed below in connection with FIG. 5. In such situations, $\gamma$ can help adjusting the confidence level on the intention language model.

Once the query language model p(w|q) is estimated, app pages relevant to the language model can be retrieved with KL-divergence retrieval model with Dirichlet prior smoothing parameter.

A score function to score an app page $a_j$ with respect to query q is defined as $$\text{score}(a_j, q) = \left[ \sum_{w \in a_j} p(w|q) \log \frac{p_s(w|a_j)}{\delta_{aj} p(w|a, A)} \right] + \log \delta_{aj} \quad (2)$$

where a word w's smoothed probability $p_s(w|a_j)$, a background language model p(w|a,A), and the coefficient $\delta_{aj}$ are defined as $$p_s(w|a_j) = \frac{|a_j|}{|a_j| + \tau} \cdot \frac{\text{count}(w, a_j)}{|a_j|} + \frac{\tau}{|a_j| + \tau} \cdot p(w|a, A) \quad (3)$$

$$p(w|a, A) = \beta \frac{\text{count}(w, a)}{\sum_{w'} \text{count}(w', a)} + (1 - \beta) \frac{\text{count}(w, A)}{\sum_{w'} \text{count}(w', A)}$$

$$\delta_{a,j} = \frac{\tau}{\sum_{w} \text{count}(w, a_j) + \tau}$$

where $|a_j|$ is the length of $a_j$'s text representation, and $\tau$ is the Dirichlet prior smoothing parameter.

Thus, $p_s(w|a_j)$ is a smoothed language model of $a_j$ using language models of a and A. By keeping only the highest probability words in the query language model and renormalizing it, it can process a query very efficiently with inverted index since only app pages containing a query language model word are considered in the formula (2). In some embodiment, for example, the top 50 words in the query language model can be kept. The steps of estimating the intention language model $p(w|I_q)$ is described in the following.

In some cases, measuring relevance directly between a query and app pages may not be ideal when the query does not explicitly reveal the user intent. In order to infer user intention hidden in the status text, parallel corpora 402 can be built to contain text with implicit intent and their corresponding texts with explicit intent. Thus, a user query with implicit intent is matched with similar text in the parallel corpora to provide us their corresponding explicit intent texts.

In some embodiments, text data at social media can be employed to build such parallel corpora 402. In some other embodiments, any other useful resources, such as chat logs, movie scripts, and question and answering data, etc. can be used to build parallel corpora 402.

Since social media texts are noisy, a relatively strict rules can be employed to build parallel corpora 402. In order to match implicit intention texts with explicit intention texts, templates such as "i want <EXP> because <IMP>" can be made, where <EXP> is explicit intention text and <IMP> is implicit intention text. For example, a user status text "i want to eat pizza because i am hungry" matches our template with the implicit intention text being "i am hungry" and the corresponding explicit intention text being "to eat pizza."

In the template, any other suitable words other than "want" can be used, such as "need," "should," "wanna," etc.

The texts in <EXP> and <IMP> of each user status text become document data in $D^{exp}$ and $D^{imp}$, respectively, while their association is preserved. To filter out noisy sentences, restrictions to the matching sentences are forced. For example, punctuation is not allowed between <EXP> and <IMP>, and sentences starts with "I" is always required.

It should be noted that, any other suitable templates that can match implicit intention texts with explicit intention texts can be used to build parallel corpora 402. However, to keep high precision instead of high recall, in some embodiments, the above template is used because it is simple and can provide relatively precise matching result.

In some embodiments, an information retrieval approach can be used to match user query 404 with its similar implicit intention texts 406 in parallel corpora 402. The Query Likelihood retrieval model can be employed to score an implicit intent document $d^{imp}$ respect to query q with formulas:

$$\text{score}(q, d^{imp}) = \prod_{w \in q} p_s(w|d^{imp}) \quad (4)$$

$$p_s(w|d^{imp}) = \frac{|d^{imp}|}{|d^{imp}| + w} p_{ml}(w|d^{imp}) + \frac{w}{|d^{imp}| + w} p(w|D^{imp})$$

$$p(w|D^{imp}) = \frac{\text{count}(w, D^{imp})}{\sum_{w'} \text{count}(w', D^{imp})}$$

In some embodiments, the formulas can be further modified to process a query efficiently.

The retrieved documents are sorted by their scores, and top F documents can be kept, yielding $D_q^{imp}$ storing in the implicit intention text storage 406, which are regarded as relevant to q.

Then, returning to FIG. 3, at Step 310, user intention in the query can be inferred by using the parallel corpora and the matched query texts (e.g., implicit intention texts). In some embodiments, inferring the user intent using the parallel corpora based on the implicit intent text can include: matching the implicit intent text with the multiple user implicit query texts in the implicit queries database of the parallel corpora, and retrieving the corresponding explicit intent text based on a matched user implicit query text.

For example, the user intent determination module 410 can use the corresponding explicit intent documents $D_q^{exp} = \{d_1^{exp}, \ldots, d_F^{exp}\}$ storing in the explicit intention text storage 408 to infer user intent. It should be noted that this process is similar to pseudo relevance feedback approaches in the literature, but it differs in that it eventually uses the corresponding explicit intent documents instead of the retrieved documents.

In order to infer the intention language model $p(w|I_q)$ from $D_q^{exp}$, the intention topic modeling can be employed. That is, various user intentions in $D^{exp}$ can be modeled as pre-processing, and then, the intentions in q can be inferred using the intention topic models.

Employing such intention topic modeling can provided several benefits. First, various intentions can be understood in a given query. The same query may have different intentions depending on the user context, and the intention topics can contribute to understanding such different intentions by inferring multiple intentions. Second, noisy topics that impair the intention language model can be removed. The intention topics that do not occur enough in $D_q^{exp}$, can be regarded as likely noisy topics and be excluded. Third, the inferred user intentions can be understood by humans in a straightforward way. If the resulting intention language model contains multiple intentions or much noise, humans may not understand the language model well. However, by inferring intention topics and removing noise in $D_q^{exp}$, intention topic modeling can provide a list of intentions in q, which humans can understand more easily.

$D^{exp}$ can be pre-processed to model user intentions by topic modeling approach, Intention Latent Dirichlet Allocation (LDA), with parameters $\alpha$, $\beta$, and K. The learned word probability distribution for each intention topic $\hat{\phi}_k$ is then given to the Intention LDA in order to infer intentions in $D_q^{exp}$.

Figure 5:
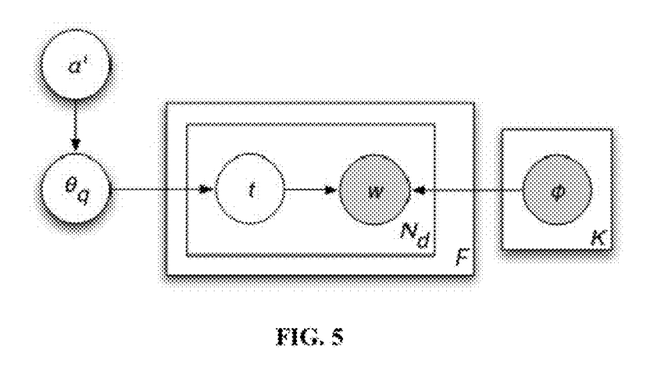
FIG. 5 illustrates a structure schematic diagram of an exemplary graphical representation of Intention Latent Dirichlet Allocation (LDA) modeling consistent with the disclosed embodiments.

Referring to FIG. 5, an exemplary graphical representation of Intention LDA is depicted in accordance with some embodiments of the disclosed subject matter. F is the number of explicit intent documents for a query, $N_d$ is the number of words in each document, and K is the number of intention topics.

The generative expression of the explicit intention text in DrP is as follows. For each word of explicit intention text d, the author first chooses an intention $t_{d,i}$ according to the query-level intention distribution $\theta_q$, which is drawn from a Dirichlet distribution with a symmetric vector a'. Then, the author chooses a word $w_{d,i}$ according to a word distribution $\hat{\phi}_{t_{d,i}}$, which is pre-estimated from $D^{exp}$ by LDA. This process is repeated for all words in $D_q^{exp}$ for I iterations.

The collapsed Gibbs sampling formula to infer the intention assignment for each word $t_{d,i}$ is defined as $$p(t_{d,i} \mid \hat{\Phi}, T_{\setminus d,i}, \alpha') \propto p(w_{d,i} \mid t_{d,i}, \hat{\Phi}) \cdot p(t_{d,i} \mid T_{\setminus d,i}, \alpha') \propto \quad (5)$$

$$p(w_{d,i} \mid \hat{\Phi}_{t_{d,i}}) \cdot \frac{N_{t_{d,i}|D_q^{exp}}^{\setminus d,i} + \alpha'}{N_{D_q^{exp}} - 1 + K\alpha'}$$

where T is a set of all intention assignments in $D_q^{exp}$, "\d, i" means excluding d's ith data, and a' is a symmetric vector {a', ... , a'}. N is the number of words that satisfy the superscript and subscript conditions. Thus, $N_{t_{d,i}|D_q^{exp}}^{\setminus d,i}$ is the number of words in $D_q^{exp}$ assigned with the intention $t_{d,i}$ excluding the ith word in d, and $N_{D_q^{exp}}$ is the number of all words in $D_q^{exp}$.

This model is similar to the regular LDA when it is applied to infer topics in new documents, except that the intention distribution $\theta_q$ is estimated at a query-level, not a document-level. This is because the data set is expected to be very sparse. Both implicit and explicit texts consist of a few words, so documents used herein are much shorter than the typical documents. This problem of short text results in less word co-occurrence data, so the topics cannot be estimated well. To solve the problem, short texts can be aggregated to make a large text, if the short texts are believed to have similar topic distributions. Similarly, assume that the retrieved texts in $D_q^{exp}$ for q have the similar topic distributions, the query-level estimation can be used for $\theta_q$.

The intention language model $p(w|I_q)$ can be built with the estimations from the intention topic model.

$$p(w \mid I_q) = \sum_{t \in Intentions(q)} p(w \mid t, D_q^{exp}) \cdot p(t \mid D_q^{exp}) \quad (6)$$

where Intentions(q) is a set of candidate intentions for q.

In order to remove noisy topics as discussed earlier in this section, not all possible topics are utilized. Instead, only top X intentions are kept according to $p(t|D_q^{exp})$, which is the probability of the intention being in the retrieved explicit intention text. Intuitively, a few top intentions for q can satisfy general users' needs, the other intentions that are likely to be noisy can be excluded.

The probabilities $p(w|t, D_q^{exp})$ and $p(t|D_q^{exp})$ are defined as $$p(w \mid t, D_q^{exp}) = \frac{\hat{N}_{t|D_q^{exp}}}{\hat{N}_{t|D_q^{exp}} + \mu} \cdot p_{ml}(w \mid t, D_q^{exp}) + \frac{\mu}{\hat{N}_{t|D_q^{exp}} + \mu} \cdot p(w \mid \hat{\Phi}_t) \quad (7)$$

$$p(t \mid D_q^{exp}) = \frac{\hat{N}_{t|D_q^{exp}} + \alpha'}{\hat{N}_{t|D_q^{exp}} + K\alpha'}$$

where $\hat{N}$ and $\hat{\Phi}_t$ are estimations from the intention topic model and the regular LDA, respectively, $\mu$ is the smoothing parameter. $p(t|D_q^{exp})$ is normalized to have its sum equal to one if $T_q$ doesn't contain all possible intentions.

The $p(w|I_q)$ is smoothed in a topic-level. That is, for each topic, $p(w|t, D_q^{exp})$ is smoothed with its posterior estimation from LDA by Dirichlet prior smoothing. Thus, its ML estimation, $$p_{ml}(w \mid t, D_q^{exp}) = \frac{\hat{N}_{w, t D_q^{exp}}}{\hat{N}_{t D_q^{exp}}},$$

gets higher weight if more words are assigned with t. When $\mu=0$, the estimation is the same as maximum likelihood estimation, and when $\mu$ approaches to infinity, the estimation becomes the same as posterior estimation from LDA.

With such topic-level smoothing, two major benefits can be expected. Firstly, the intention topics can be dynamically smoothed depending on the number of assigned words. Intuitively, if more words are assigned with a topic t, its ML estimation can be more trusted since there are more evidences about t in the text $D_q^{exp}$. In addition, each intention topic model can be customized with q. When a user query q contains intentions that are not captured well by existing intention topics, the per-topic smoothing can help transform existing intention topics into new intention topics with the evidence present in the retrieved text. It should be noted that, in order to obtain reliable probability distributions, multiple Markov chains can be run to take the average values of the topic assignments.

Based on the top X intentions obtained from the user intent determination module 410 according to the probability of the intention being in the retrieved explicit intention text $p(t|D_q^{exp})$, the App page recommendation module 412 can search multiple App pages that are relevant to the top X intentions.

Returning to FIG. 3, at 312, App pages can be ranked according to the inferred intents.

In some embodiments, the searched App pages can be ranked according to the inferred intents. In some embodiments, the apps can be ranked based on their descriptions and reviews. For example, for each app, its app description and user reviews are preprocessed to generate a text corpus. Then, a new language model can be generated representation for each app based on the text corpus, and the app is scored for the given query word based on the representation. An app score for a given query is then computed from the scores of query words. Multiple apps can be ranked according to their app scores Based on the ranking result, top app pages that are most relevant to the user query can be recommended to the user (314). That is, based on the ranking result, the App page recommendation module 412 can recommend the top app pages that are most relevant to the user query 404 to the user 414. For example, a user interface including a list of the top app pages that are most relevant to the user query 404 can be presented to the user 414 for prompt the user to visit.

Accordingly, a method and a system for App page recommendation via inference of implicit intent in a user query are provided. The disclosed method and system can infer a user's implicit intention based on a query used for virtual assistants, perform an app retrieval based on the implicit queries, and recommend app pages that would satisfy a user's immediate need that is implicitly expressed in the query.

The disclosed method and system for App page recommendation via inference of implicit intent in a user query can be implemented to various applications. For example, by analyzing user intention in such query including implicit intent, product manufacturers or service providers can provide relevant items or targeted ads to the users based on the predicted intention. Such recommendation can also benefit users since they can find products or services they need without expressing their intention explicitly.

The disclosed method and system for App page recommendation via inference of implicit intent in a user query is not limited to commercial. The method and system can also be used in various interesting applications besides virtual assistants. For example, it can be used in social media to provide personalized recommendation and advertising for users who write status text with implicit intent. The method and system can also help other systems to prevent certain events such as suicide and mass shooting by analyzing implicit intention in social media user status.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for App recommendation, comprising:
based on social media contents generated by a user, collecting a plurality of user implicit query texts from the user;
building a plurality of user explicit query texts by obtaining Apps retrieved by the use, wherein the retrieved App pages contain the plurality of user explicit query texts;
establishing a parallel corpora comprising an implicit query database including the plurality of user implicit query texts, and an explicit query database including the plurality of user explicit query texts, wherein the plurality of user implicit query texts correspond to the plurality of user explicit query texts;
receiving a voice user query from the user;
converting the voice user query to a text query;
extracting an implicit intent text from the text query;
inferring a user intent using the parallel corpora based on the extracted implicit intent text, comprising:
matching the implicit intent text with the plurality of user implicit query texts in the implicit queries database of the parallel corpora; and
retrieving the corresponding explicit intent text based on a matched user implicit query text;
ranking a plurality of Apps according to the inferred user intent, wherein each of the plurality of Apps represents a software program designed to run on a mobile device; and
recommending a subset of the plurality of Apps to the user based on the ranking of the plurality of Apps by providing a downloading link or an executing link of the App of the plurality of Apps.

2. The method of claim 1, wherein extracting implicit intent text from the text query comprises:
estimating a query language model of a word in the text query by using an intention likelihood of the word and a confidence weight of the word.

3. The method of claim 1, wherein matching the implicit intent text with the plurality of user implicit query texts comprises:
employing a Query Likelihood retrieval modeling to score an implicit intent document with respect to the implicit intent text extracted from the text query.

4. The method of claim 3, wherein retrieving the corresponding explicit intent text based on a matched user implicit query text comprises:
pre-processing the plurality of explicit intent text to generate a plurality of intention topic models by employing an intention topic modeling;
estimating each intention topic model to calculate a probability that the corresponding explicit intention text matches the implicit intent document; and
removing a subset of the plurality of intention topic models that are considered as noisy topics.

5. The method of claim 4, wherein the intention topic modeling is Intention Latent Dirichlet Allocation (LDA) model.

6. The method of claim 4, wherein estimating each intention topic models comprises:
running a plurality of Markov chains and taking an average values of a plurality of probabilities that are resulted by the plurality of Markov chains.

7. The method of claim 1, wherein ranking the plurality of Apps according to the inferred user intent comprises: retrieving the plurality of Apps that is relevant to the inferred user intent; measuring a relevance index of each of the plurality of Apps to the inferred user intent; and ranking the plurality of Apps based on the measured relevance indexed.

8. The method of claim 7, wherein retrieving the plurality of Apps that is relevant to the inferred user intent is using KL-divergence retrieval model with Dirichlet prior smoothing parameter.

9. The method of claim 1, wherein:
the plurality of user implicit query texts are correspond to the plurality of user explicit query texts by using a template "I<EXP> because <IMP>", wherein <EXP> is one explicit intention text and <IMP> is one implicit intention text.

10. A system for App page recommendation, comprising:
a memory;
a processor coupled to the memory, wherein the processor is configured to:
based on social media contents generated by a user, collect a plurality of user implicit query texts from the user;
build a plurality of user explicit query texts by obtaining Apps retrieved by the user, wherein the retrieved Apps contain the plurality of user explicit query texts;
establish a parallel corpora comprising an implicit queries database including the plurality of user implicit query texts, and an explicit queries database including the plurality of user explicit query texts, wherein the plurality of user implicit query texts are correspond to the plurality of user explicit query texts with each other;
receive a voice user query from the user;
convert the voice user query to a text query;
extract an implicit intent text from the text query;
infer a user intent using the parallel corpora based on the extracted implicit intent text;
matching the implicit intent text with the plurality of user implicit query texts in the implicit queries database of the parallel corpora;
retrieving the corresponding explicit intent text based on a matched user implicit query text;
rank a plurality of Apps according to the inferred user intent, wherein each of the plurality of Apps represents a software program designed to run on a mobile device; and
recommend a subset of the plurality of Apps to the user based on the ranking of the plurality of Apps by providing a downloading link or an executing link of the App of the plurality of Apps.

11. The system of claim 10, wherein the processor is further configured for:
estimating a query language model of a word in the text query by using an intention likelihood of the word and a confidence weight of the word.

12. The system of claim 10, wherein the processor is further configured for:
employing a Query Likelihood retrieval modeling to score an implicit intent document with respect to the implicit intent text extracted from the text query.

13. The system of claim 12, wherein the processor is further configured for:
pre-processing the plurality of explicit intent text to generate a plurality of intention topic models by employing an intention topic modeling;
estimating each intention topic model to calculate a probability that the corresponding explicit intention text matches the implicit intent document; and
removing a subset of the plurality of intention topic models that are considered as noisy topics.

14. The system of claim 13, wherein the processor is pre-processing the plurality of explicit intent text by using Intention Latent Dirichlet Allocation (LDA) model.

15. The system of claim 13, wherein the processor is further configured for:
running a plurality of Markov chains and taking an average values of a plurality of probabilities that are resulted by the plurality of Markov chains.

16. The system of claim 10, wherein the processor is further configured for:
retrieving a plurality of Apps that is relevant to the inferred user intent;
measuring a relevance index of each of the plurality of Apps to the inferred user intent; and
ranking the plurality of Apps based on the measured relevance indexed.

17. The system of claim 16, wherein the processor is retrieving the plurality of Apps by using KL-divergence retrieval model with Dirichlet prior smoothing parameter.

18. The system of claim 10, wherein:
each user implicit query text in the implicit queries database is associated with a corresponding user explicit query text in the explicit queries database by using a template "I<EXP> because <IMP>", wherein <EXP> is the explicit intention text and <IMP> is the corresponding implicit intention text.

* * * * *